US007567689B2

(12) United States Patent
Iwasaki

(10) Patent No.: US 7,567,689 B2
(45) Date of Patent: Jul. 28, 2009

(54) AUTHENTICATION APPARATUS AND AUTHENTICATION METHOD

(75) Inventor: Taiji Iwasaki, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 667 days.

(21) Appl. No.: 11/311,382

(22) Filed: Dec. 20, 2005

(65) Prior Publication Data
US 2006/0133652 A1 Jun. 22, 2006

(30) Foreign Application Priority Data
Dec. 20, 2004 (JP) ............................. 2004/367546

(51) Int. Cl.
G06K 9/00 (2006.01)
(52) U.S. Cl. ...................... 382/115; 235/382; 340/5.52; 340/5.82; 382/218; 713/186
(58) Field of Classification Search ................ 235/380, 235/382, 382.5; 340/5.1, 5.2, 5.52, 5.82, 340/5.8; 382/115, 117, 118, 124, 218; 713/155, 713/161, 186
See application file for complete search history.

(56) References Cited

U.S. PATENT DOCUMENTS

| 6,952,775 | B1 * | 10/2005 | Miura | 713/182 |
| 6,990,588 | B1 * | 1/2006 | Yasukura | 713/186 |
| 7,260,237 | B2 * | 8/2007 | Nishimoto et al. | 382/100 |
| 2003/0065957 | A1 * | 4/2003 | Tsuji et al. | 713/202 |
| 2006/0102717 | A1 * | 5/2006 | Wood et al. | 235/382 |
| 2006/0147093 | A1 * | 7/2006 | Sanse et al. | 382/115 |
| 2006/0193500 | A1 * | 8/2006 | Awatsu et al. | 382/115 |
| 2007/0294540 | A1 * | 12/2007 | Wadayama | 713/186 |
| 2008/0098466 | A1 * | 4/2008 | Yoshida et al. | 726/5 |
| 2008/0250495 | A1 * | 10/2008 | Hayashi | 726/21 |

FOREIGN PATENT DOCUMENTS

| JP | 2001-67523 A | 3/2001 |
| JP | 2001-202494 A | 7/2001 |
| JP | 2004-220206 A | 8/2004 |

* cited by examiner

Primary Examiner—Gregory M Desire
(74) Attorney, Agent, or Firm—Sughrue Mion, PLLC

(57) ABSTRACT

An authentication apparatus and authentication method in which ID information and a registered facial characteristic amount of the principal and of an associated individual associated with the principal in advance are read out by the card reader. The principal and associated individual accompanying the principal are imaged by the imaging section, and a characteristic amount of each of them is calculated by a characteristic amount generating section based on the image data obtained. The registered and obtained characteristic amounts of each of them are compared by the characteristic amount matching level calculating section to calculate respective matching levels. The principal is initially authenticated by the authenticating section by comparing the matching level with a threshold level. If it is unsuccessful, the associated individual is authenticated in the similar way, and if it is successful, the principal is determined to be successfully authenticated.

15 Claims, 2 Drawing Sheets

AUTHENTICATION APPARATUS AND AUTHENTICATION METHOD

BACKGROUND OF THE INVENTION

1. Field of the Invention

The present invention relates to an authentication apparatus and authentication method for authenticating an individual to be authenticated (authenticatee) using biometric information of the authenticatee, such as the face, fingerprint, iris, or the like.

2. Description of the Related Art

Authentication systems in which an individual is authenticated by using biometric information of the individual, such as the face, fingerprint, iris, or the like are proposed. An authentication system that performs authentication based on an ID card is also proposed. In the system, an individual is authenticated through the steps of: recording in advance biometric information of an individual and ID information for identifying the individual on an ID card including an IC chip; reading out the biometric information and ID information from the ID card; obtaining biometric information of the authenticatee through imaging, or the like; and matching the newly obtained biometric information with the registered biometric information read out from the ID card.

In the mean time, biometric characteristics of a human being may change as age progresses or due to, for example, a surgical operation, so that the biometric information that indicates the biometric characteristics of the individual is not always the same. Further, biometric information may be influenced by the environmental conditions under which the biometric information is obtained. For example, if the biometric information is to be obtained through imaging, the imaging conditions may influence the biometric information. Consequently, the authentication system that uses biometric information causes a problem that an authenticatee may not sometimes be authenticated and unable to receive the intended service to be provided after successful authentication, although the authenticatee is the authentic principal who should be authenticated successfully by the system.

Here, an agent authentication method as described, for example, in Japanese Unexamined Patent Publication Nos. 2001-202494 and 2001-067523 may be used in order to avoid the problem described above. In the agent authentication method, biometric information of an agent who is authorized to use an IC card by the card holder or the principal is registered on the card in addition to biometric information of the principal, and the agent is permitted to use the card when the authentication is successfully completed by comparing the registered biometric information of the agent with that obtained at the time of the authentication.

According to such authentication method, even if the authentication of the principal is unsuccessful, if the authentication of the agent accompanying the principal is successful, the agent may receive the intended service, and the principal in turn may receive the service through the agent.

In the agent authentication method described above, it is the agent who has been actually authenticated, so that the service is basically provided only to the agent, not to the principal. Thus, the principal is unable to receive the service directly even in the case, for example, where indirect reception of the service by the principal is meaningless. Further, in the agent authentication method, the agent is allowed to use the card alone. Accordingly, the method is not suitable for use in the case where the principal does not want the card to be used by the individual other than the principal without supervision of the principal. This may include the case, for example, where the service provided is closely related to the private information of the principal.

In view of the circumstances described above, it is an object of the present invention to provide an authentication apparatus and authentication method that allows a card holder or the principal to receive the intended service to be provided after successful authentication under his/her own supervision by providing an alternative means for authenticating the principal even if initial authentication of the principal is unsuccessful.

Japanese Unexamined Patent Publication No. 2004-220206 discloses a principal authentication system, in which an authentication level of a principal is decreased according to authentication history of an associated individual associated with the principal in advance, including the time and location where the authentication information has been obtained for authenticating the associated individual. But the system does not solve the problem described above when authentication of the principal is unsuccessful. Thus, it is different from the present invention.

SUMMARY OF THE INVENTION

The authentication apparatus according to the present invention is an apparatus, comprising:

an information readout means for reading out personal information of a primary authenticatee including at least ID information thereof recorded on an authentication card;

a registered biometric information storing means for storing registered biometric information of the primary authenticatee and of a secondary authenticatee associated with the primary authenticatee in advance, with the registered biometric information of the primary authenticatee and of the secondary authenticatee being linked to the ID information of the primary authenticatee;

a registered biometric information readout means for reading out the registered biometric information of the primary authenticatee and of the secondary authenticatee from registered biometric information storing means based on the personal information read out by the information readout means;

a biometric information obtaining means for obtaining biometric information of the primary authenticatee and of the secondary authenticatee; and an authenticating means for performing an authentication process comprising the steps of:
  matching the registered and obtained biometric information of the primary authenticatee with each other to initially authenticate the primary authenticatee;
  matching the registered and obtained biometric information of the secondary authenticatee with each other to further authenticate the secondary authenticatee if the authentication of the primary authenticatee is unsuccessful; and
  determining that the primary authenticatee is successfully authenticated if the authentication of the secondary authenticatee is successful.

The "registered biometric information" as used herein means biometric information of the primary authenticatee and of the secondary authenticatee, which already exists before the matching is performed.

The "registered biometric storing means" for storing the registered biometric information may be, for example, the authentication card itself, a database, or the like. That is, the registered biometric information of the primary authenticatee and of the secondary authenticatee may be stored in the authentication card or a database. If the registered biometric information is stored on the authentication card, the "information readout means" also serves as the "registered biometric information readout means".

Preferably, in the authentication apparatus according to the present invention, the "authenticating means" is a means for calculating a matching level between the registered and obtained biometric information to determine that the authentication is successful when the matching level calculated exceeds a first predetermined level, and the primary authenticatee is determined to be successfully authenticated only if the matching level for the primary authenticatee at the time of the unsuccessful authentication thereof exceeds a second predetermined level which is lower than the first predetermined level in response to successful authentication of the secondary authenticatee.

The "first predetermined level" that serves as the criterion of the matching level for use by the authenticating means in determining whether or not authentication is successful is not necessarily the same for the primary and secondary authenticatees. For example, the matching level may be set higher for the secondary authenticatee than for the primary authenticatee.

In the authentication apparatus according to the present invention, the "biometric information" may be any information that may be used for authenticating an authenticatee, such as the fingerprint, iris of the eye, or the like. From the view point of ease of acquisition and implementation of the obtaining means (biometric information obtaining means), however, it is preferable that facial image data of the authenticatee are used. In this case, the "biometric information obtaining means" is an imaging means.

As for the "biometric information", raw information, such as raw image data or the like, or a characteristic amount obtained from the raw information may be used.

The authentication method according to the present invention is a method, comprising:

a registered biometric information storing step for storing registered biometric information of a primary authenticatee and of a secondary authenticatee associated with the primary authenticatee in advance, with the registered biometric information of the primary authenticatee and of the secondary authenticatee being linked to the ID information of the primary authenticatee;

an information readout step for reading out personal information of the primary authenticatee including at least ID information thereof recorded on an authentication card;

a registered biometric information readout step for reading out the registered biometric information of the primary authenticatee and of the secondary authenticatee stored by the biometric information storing step based on the personal information read out by the information readout step;

a biometric information obtaining step for obtaining biometric information of the primary authenticatee and of the secondary authenticatee; and an authenticating step for performing an authentication process comprising the steps of:

matching the registered and obtained biometric information of the primary authenticatee with each other to initially authenticate the primary authenticatee;

matching the registered and obtained biometric information of the secondary authenticatee with each other to further authenticate the secondary authenticatee if the authentication of the primary authenticatee is unsuccessful; and determining that the primary authenticatee is successfully authenticated if the authentication of the secondary authenticatee is successful.

Preferably, in the authentication method according to the present invention, the authenticating step is a step for calculating a matching level between the registered and obtained biometric information to determine that the authentication is successful when the matching level calculated exceeds a first predetermined level, and the primary authenticatee is determined to be successfully authenticated only if the matching level for the primary authenticatee at the time of the unsuccessful authentication thereof exceeds a second predetermined level which is lower than the first predetermined level in response to successful authentication of the secondary authenticatee.

The authentication apparatus and authentication method according to the present invention may be applied to different types of security management, including ATM, entering/leaving management, database access management, membership facility utilization management, and the like.

According to the authentication apparatus and authentication method of the present invention, if initial authentication of the primary authenticatee is initially unsuccessful, the secondary authenticatee accompanying the primary authenticatee is authenticated, and the principal is determined to be successfully authenticated if the authentication of the associated individual is successful. Thus, the present embodiment may avoid the problem that an individual other than a card holder or the primary authenticatee is allowed to directly receive the intended service to be provided after successful authentication, or to use the card without supervision of the principal as in the agent authentication method as described, for example, in Japanese Unexamined Patent Publication Nos. 2001-202494 and 2001-067523. Thus, when initial authentication of the principal is unsuccessful, the principal may obtain the authentication through the alternative means and directly receive the intended service to be provided after successful authentication under his/her own supervision.

DESCRIPTION OF THE PREFERRED EMBODIMENTS

Figure 1:
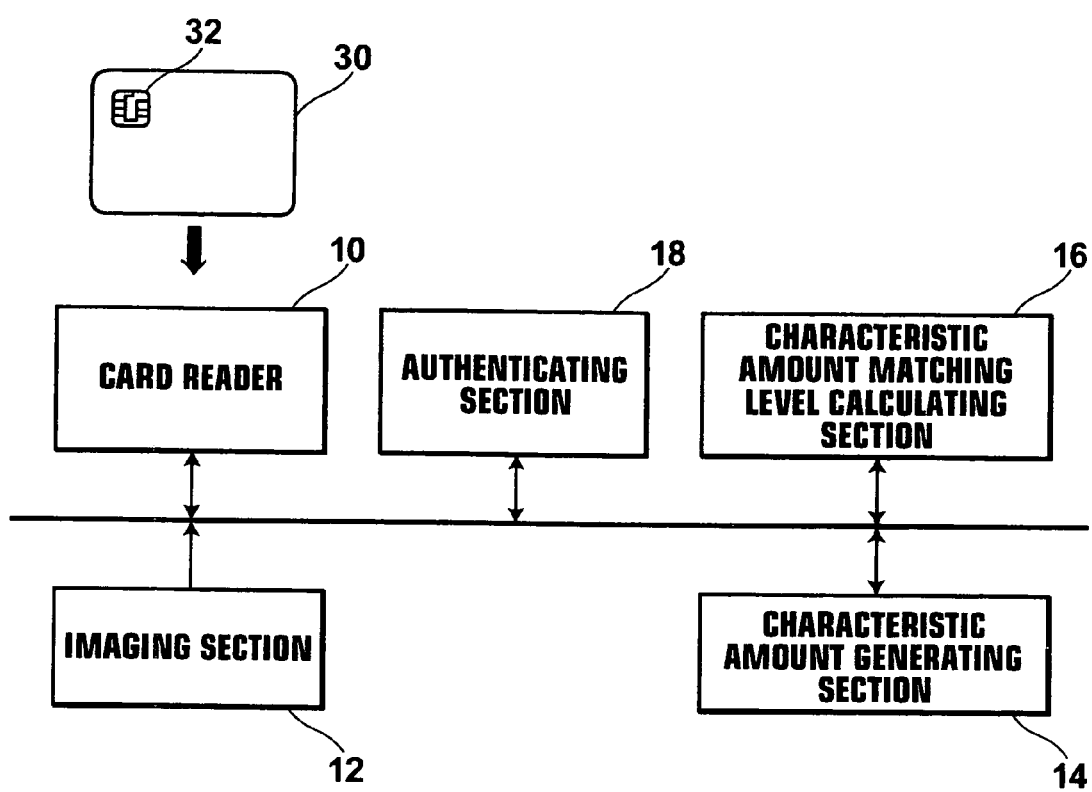
FIG. 1 is a schematic block diagram of an authentication system 1 according to an embodiment, illustrating the construction thereof.

Hereinafter, a preferred embodiment of the present invention will be described with reference to accompanying drawings. FIG. 1 is a schematic block diagram of an authentication system 1 according to the present embodiment, illustrating the construction thereof. As shown in FIG. 1, the authentication system 1 according to the present embodiment includes a card reader 10; an imaging section 12; characteristic amount generating section 14; a characteristic amount matching level calculating section 16; and an authenticating section 18. The card reader 10 serves as the "information readout means" and "registered biometric information readout means" in the present invention. The imaging section 12 serves as the "biometric information obtaining means" in the present invention.

FIG. 1 also shows an ID card 30 including an IC chip 32 that stores ID information and facial characteristic amount of a primary authenticatee (principal), and of a secondary authenticatee (associated individual) associated with the principal in advance. The card reader 10 reads out the ID information and facial characteristic amount of the principal and of the associated individual from the IC chip 32 of the ID card 30 as the information for identifying the authenticatees. The card reader 10 may be a noncontact or contact type card reader for reading out the information from the IC chip 32.

The imaging section 12 obtains facial image data of the principal and of the associated individual (as required) by imaging the faces thereof.

The characteristic amount generating section 14 generates a facial characteristic amount of the principal and of the associated individual (as required) based on the facial image data obtained by the imaging section 12 by imaging the faces thereof. Here, positional relationship among the eyes, nose, ears, and mouth is used as the characteristic amount, but the facial profile may also be used.

The characteristic amount matching level calculating section 16 checks the characteristic amount read out from the IC chip 32 by the card reader 10 ("registered characteristic amount", since it has already been registered) against the characteristic amount generated based on the facial image data obtained by the imaging section 12 by imaging (imaged characteristic amount), and calculates a characteristic amount matching level between them.

When the positional relationship among the eyes, nose, ears, and mouth is used as the characteristic amount, the characteristic amount matching level calculating section 16 calculates a characteristic amount matching level that indicates how closely the positional relationship among the eyes, nose, ears, and mouth based on the registered characteristic amount is matched with that based on the imaged characteristic amount.

Initially, the authenticating section 18 performs authentication for the principal. Here, the characteristic amount matching level of the principal is obtained from the characteristic amount matching level calculating section 16, and if the matching level obtained exceeds a predetermined level (first authentication level), the authentication of the principal is determined to be successful. If the matching level obtained is below the first authentication level, then the authentication of the principal is determined to be tentatively unsuccessful. If that is the case, the matching level is checked to see if it exceeds another predetermined level (second authentication level) which is lower than the first authentication level. If the matching level exceeds the second authentication level, then the authentication process moves to authenticate the associated individual. Here, the characteristic amount matching level of the associated individual is obtained from the characteristic amount matching level calculating section 16, and if the matching level obtained exceeds the first authentication level, the authentication of the associated individual is determined to be successful, and at the same time the principal is also determined to be successfully authenticated.

In the mean time, if the characteristic amount matching level when the authentication of the principal is determined tentatively unsuccessful is below the second authentication level, or if the authentication of the associated individual is determined to be unsuccessful, the authentication of the principal is conclusively determined to be unsuccessful.

Thereafter, information indicating authentication results (i.e., information that indicates whether or not the authentication of the principal is successful) is outputted from the authenticating section 18, which is used in various security systems that employ the authenticating system according to the present embodiment.

Figure 2:
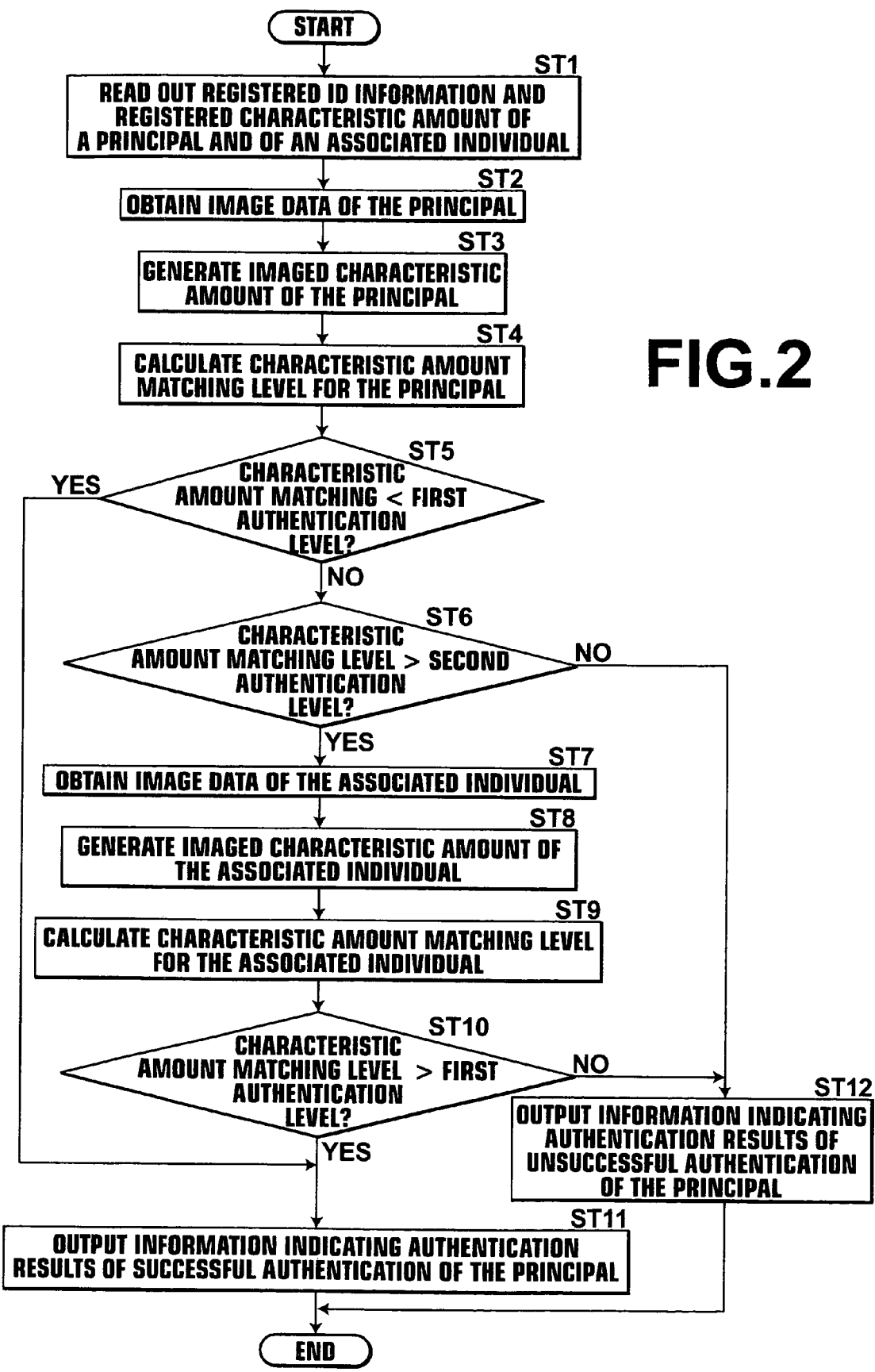
FIG. 2 is a flow chart illustrating a procedure performed in the authentication system 1 shown in FIG. 1.

Hereinafter, a procedure performed in the present embodiment will be described. FIG. 2 is a flow chart illustrating the procedure performed in the present embodiment. Initially, ID information and registered characteristic amount of the principal and of the associated individual are read out from the IC chip 32 of the ID card 30 by the card reader 10 (step ST1). Image data of the principal are obtained by the imaging section 12 by imaging the face of the principal (step ST2). Then, imaged characteristic amount of the principal is generated by the characteristic amount generating section 14 based on the image data of the principal (step ST3). A matching level between the registered and imaged characteristic amounts of the principal is calculated by the characteristic amount matching level calculating section 16 by comparing them (step ST4).

The characteristic amount matching level of the principal is checked by the authenticating section 18 to see if it exceeds the first authentication level (step ST5). If step ST5 is positive, information indicating the authentication results of successful authentication of the principal is outputted by the authenticating section 18 (step ST11), and the process is terminated.

If step ST5 is negative, the characteristic amount matching level of the principal is checked by the authenticating section 18 to see if it exceeds the second authentication level (step ST6). If step ST6 is negative, information indicating the authentication results of unsuccessful authentication of the principal is outputted by the authenticating section 18 (step ST12), and the process is terminated.

If step ST6 is positive, image data of the associated individual is further obtained by the imaging section 12 by imaging the face of the associated individual accompanying the principal (step ST7). Then, imaged characteristic amount of the associated individual is generated by the characteristic amount generating section 14 based on the image data of the associated individual (step ST8). A matching level between the registered and imaged characteristic amounts of the associated individual is calculated by the characteristic amount matching level calculating section 16 by comparing them (step ST9).

The characteristic amount matching level of the associated individual is checked by the authenticating section 18 to see if it exceeds the first authentication level (step ST10). If step ST10 is positive, information indicating the authentication results of successful authentication of the principal is outputted by the authenticating section 18 (step ST11), and the process is terminated.

If step 10 is negative, information indicating the authentication results of unsuccessful authentication of the principal is outputted by the authenticating section 18 (step ST12), and the process is terminated.

In this way, according to the present embodiment, if initial authentication of the principal as the primary authenticatee is unsuccessful, the associated individual accompanying the principal as the secondary authenticatee is authenticated, and the principal is determined to be successfully authenticated if the authentication of the associated individual is successful. Thus, the present embodiment may avoid the problem that the individual other than a card holder or the primary authenticatee is allowed to directly receive the intended service to be provided after successful authentication, or to use the card without supervision of the principal as in the agent authentication method as described, for example, in Japanese Unexamined Patent Publication Nos. 2001-202494 and 2001-067523. If initial authentication of the principal is unsuccessful, the principal may obtain the authentication through the alternative means and directly receive the intended service to be provided after successful authentication under his/her own supervision.

In the present embodiment, the authentication process moves to the authentication of the associated individual only if the characteristic amount matching level of the principal exceeds the second authentication level. The reason is to prevent a fraudulent act in which someone else pretends to be the principal and try to obtain the authentication only through authentication of the associated individual. Even when the authentication of the principal is unsuccessful, the characteristic amount matching level should reach a certain level as long as the authenticatee is the authentic principal. By setting the second authentication level above the level which is normally obtained when someone else tries to get authenticated, such fraudulent act may be prevented.

Further, in the present embodiment, the authentication is performed using a facial characteristic amount of the authenticatee, but raw facial image data may also be used for the authentication process. Further, any biometric information may be used for the authentication process as long as it is specific to the authenticatee, such as the iris of the eye, voiceprint, fingerprint, signature data, or the like.

What is claimed is:

1. An authentication apparatus, comprising:
    an information readout means for reading out personal information of a primary authenticatee including at least ID information thereof recorded on an authentication card;
    a registered biometric information storing means for storing registered biometric information of the primary authenticatee and of a secondary authenticatee associated with the primary authenticatee in advance, with the registered biometric information of the primary authenticatee and of the secondary authenticatee being linked to the ID information of the primary authenticatee;
    a registered biometric information readout means for reading out the registered biometric information of the primary authenticatee and of the secondary authenticatee from registered biometric information storing means based on the personal information read out by the information readout means;
    a biometric information obtaining means for obtaining biometric information of the primary authenticatee and of the secondary authenticatee; and
    an authenticating means for performing an authentication process comprising the steps of:
    matching the registered and obtained biometric information of the primary authenticatee with each other to initially authenticate the primary authenticatee;
    matching the registered and obtained biometric information of the secondary authenticatee with each other to further authenticate the secondary authenticatee if the authentication of the primary authenticatee is unsuccessful; and
    determining that the primary authenticatee is successfully authenticated if the authentication of the secondary authenticatee is successful.

2. The authentication apparatus according to claim 1, Wherein:
    the authenticating means is a means for calculating a matching level between the registered and obtained biometric information to determine that the authentication is successful when the matching level calculated exceeds a first predetermined level, and
    the primary authenticatee is determined to be successfully authenticated only if the matching level for the primary authenticatee at the time of the unsuccessful authentication thereof exceeds a second predetermined level which is lower than the first predetermined level in response to successful authentication of the secondary authenticatee.

3. The authentication apparatus according to claim 1, wherein the biometric information is facial image data.

4. The authentication apparatus according to claim 1, wherein the biometric information is iris data.

5. The authentication apparatus according to claim 1, wherein the biometric information is voiceprint data.

6. The authentication apparatus according to claim 1, wherein the biometric information is fingerprint data.

7. The authentication apparatus according to claim 1, wherein the biometric information is signature data.

8. The authentication apparatus according to claim 1, wherein the information readout means is also the registered biometric information readout means.

9. An authentication method performed by an authentication apparatus, said method comprising:
    storing registered biometric information of a primary authenticatee and of a secondary authenticatee associated with the primary authenticatee to a biometric information storing means of the authentication apparatus in advance, with the registered biometric information of the primary authenticatee and of the secondary authenticatee being linked to the ID information of the primary authenticatee;
    reading out personal information of the primary authenticatee including at least ID information thereof recorded on an authentication card;
    reading out the registered biometric information of the primary authenticatee and of the secondary authenticatee stored by the biometric information storing step based on the personal information read out by the information readout step;
    obtaining biometric information of the primary authenticatee and of the secondary authenticatee with a biometric information obtaining means of the authentication apparatus; and
    performing an authentication process comprising the steps of:
    matching the registered and obtained biometric information of the primary authenticatee with each other to initially authenticate the primary authenticatee;
    matching the registered and obtained biometric information of the secondary authenticatee with each other to further authenticate the secondary authenticatee if the authentication of the primary authenticatee is unsuccessful; and
    determining that the primary authenticatee is successfully authenticated if the authentication of the secondary authenticatee is successful.

10. The authentication method according to claim 9, wherein:
    the calculating a matching level between the registered and obtained biometric information to determine that the authentication is successful when the matching level calculated exceeds a first predetermined level, and
    the primary authenticatee is determined to be successfully authenticated only if the matching level for the primary authenticatee at the time of the unsuccessful authentication thereof exceeds a second predetermined level which is lower than the first predetermined level in response to successful authentication of the secondary authenticatee.

11. The authentication method according to claim 9, wherein the biometric information is facial image data.

12. The authentication method according to claim 9, wherein the biometric information is iris data.

13. The authentication method according to claim 9, wherein the biometric information is voiceprint data.

14. The authentication method according to claim 9, wherein the biometric information is fingerprint data.

15. The authentication method according to claim 9, wherein the biometric information is signature data.

* * * * *